United States Patent
Xiang

(12) 
(10) Patent No.: US 8,570,347 B2
(45) Date of Patent: Oct. 29, 2013

(54) ELECTRONIC DEVICE AND METHOD FOR IMAGE EDITING

(75) Inventor: Run Xiang, Shenzhen (CN)

(73) Assignees: Shenzhen Futaihong Precision Industry Co., Ltd., Shenzhen (CN); Chi Mei Communication Systems, Inc., New Taipei (TW)

( * ) Notice: Subject to any disclaimer, the term of this patent is extended or adjusted under 35 U.S.C. 154(b) by 750 days.

(21) Appl. No.: 12/713,344

(22) Filed: Feb. 26, 2010

(65) Prior Publication Data

US 2011/0090248 A1    Apr. 21, 2011

(30) Foreign Application Priority Data

Oct. 20, 2009    (CN) .......................... 2009 1 0308508

(51) Int. Cl.
*G09G 5/00*    (2006.01)

(52) U.S. Cl.
USPC .......................................... 345/661; 345/660

(58) Field of Classification Search
USPC .......................................................... 345/661
See application file for complete search history.

(56) References Cited

U.S. PATENT DOCUMENTS

| | | | |
|---|---|---|---|
| 5,596,346 A * | 1/1997 | Leone et al. .................. 345/667 |
| 6,456,305 B1 * | 9/2002 | Qureshi et al. ................ 715/800 |
| 6,590,590 B1 * | 7/2003 | Wen et al. ..................... 715/764 |
| 6,694,487 B1 * | 2/2004 | Ilsar ............................. 715/247 |
| 6,791,578 B1 * | 9/2004 | Ubillos .......................... 715/716 |
| 6,964,025 B2 * | 11/2005 | Angiulo et al. ............... 715/838 |
| 7,209,149 B2 * | 4/2007 | Jogo ............................. 345/622 |
| 7,256,911 B2 * | 8/2007 | Takabayashi et al. ......... 358/1.9 |
| 7,274,382 B2 * | 9/2007 | Plut .............................. 345/660 |
| 7,454,711 B2 * | 11/2008 | Angiulo et al. ............... 715/760 |
| 7,697,161 B2 * | 4/2010 | Choi ............................. 358/1.2 |
| 7,739,616 B2 * | 6/2010 | Masukawa et al. ........... 715/788 |
| 7,821,669 B2 * | 10/2010 | Takabayashi et al. ......... 358/1.9 |
| 7,839,412 B2 * | 11/2010 | Sanno ........................... 345/581 |
| 8,161,400 B2 * | 4/2012 | Kwon ........................... 715/769 |
| 2004/0080518 A1 * | 4/2004 | Lee ............................... 345/619 |
| 2004/0088656 A1 * | 5/2004 | Washio ......................... 715/526 |
| 2005/0071771 A1 * | 3/2005 | Nagasawa et al. ............ 715/765 |
| 2009/0066730 A1 * | 3/2009 | Mikawa ........................ 345/661 |
| 2009/0158222 A1 * | 6/2009 | Kerr et al. ..................... 715/867 |

FOREIGN PATENT DOCUMENTS

| | | |
|---|---|---|
| CN | 1904827 A | 1/2007 |
| CN | 101383141 A | 3/2009 |

* cited by examiner

*Primary Examiner* — M Good Johnson
(74) *Attorney, Agent, or Firm* — Altis & Wispro Law Group, Inc.

(57) ABSTRACT

An electronic device and method for image editing include constructing a virtual wallpaper interface, which includes an image display area and a preview window. After an image is imported from the area to the preview window, the method proportionally resizes the image. If the display ratio of the resized image is greater than that of the preview window, the electronic device and method can crop the resized image to generate an edited image that fits the aspect ratio of the preview window. If not, the electronic device and method merge at least one image with the edited image and crop the merged image to generate the edited image. By enlarging the edited image, a desired image which can cover an entire screen of the electronic device is generated.

9 Claims, 4 Drawing Sheets

ELECTRONIC DEVICE AND METHOD FOR IMAGE EDITING

BACKGROUND

1. Technical Field

Embodiments of the present disclosure generally relate to image editing systems and methods, and more particularly to an electronic device and method capable of editing an image for use as a wallpaper or a background image of a display of the electronic device.

2. Description of Related Art

In general, when a display ratio of an image is not consistent with an aspect ratio of a display screen, the image will not cover the entire screen, or the display screen will not display the entire image according to the display ratio of the image. So, many beautiful pictures or images cannot be suitably displayed on the electronic device as a wallpaper or a background image.

What is needed, therefore, is an editing method to overcome the limitations described.

DETAILED DESCRIPTION

In general, the word "module," as used herein, refers to logic embodied in hardware or firmware, or to a collection of software instructions, written in a program language. In one embodiment, the program language may be Java or C. One or more software instructions in the modules may be embedded in firmware, such as an EPROM. The modules described herein may be implemented as either software and/or hardware modules and may be stored in any type of computer-readable medium or other storage device.

Figure 1:
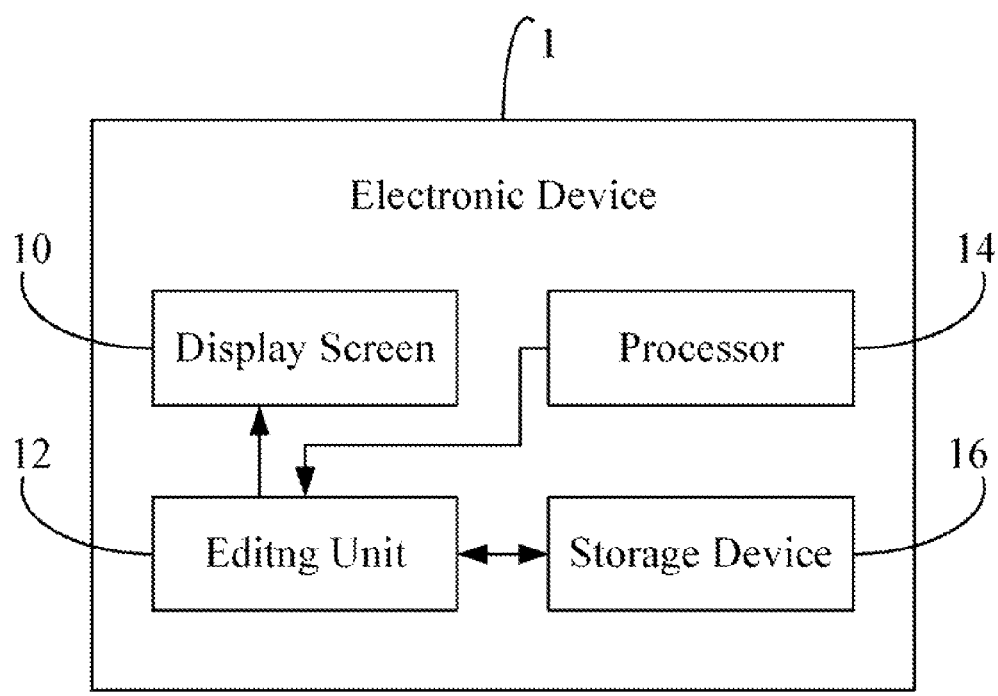
FIG. 1 is a block diagram of one embodiment of an electronic device for image editing.

FIG. 1 is a block diagram of one embodiment of an electronic device 1 comprising an editing unit 12. In one embodiment, the electronic device 1 may include a display screen 10, an editing unit 12, at least one processor 14, and a storage device 16. The storage device 16 is used to store computerized operations of the editing unit 12, and a plurality of images. The at least one processor 14 controls the editing unit 12 to construct a virtual wallpaper interface 100, and controls the editing unit 12 to import one of the plurality of images so as to edit the imported image that does not fit an aspect ratio of the display screen 10. Details of the editing process are described below in FIG. 2 and FIG. 4. In one embodiment, the electronic device 1 can be a mobile phone, a personal computer, or a processing server, for example. The storage device 16 may be random access memory (RAM) for temporary storage of information, and/or a read only memory (ROM) for permanent storage of information. In other embodiments, the storage device 16 may also be an external storage device, such as a storage card, or a data storage medium.

Figure 2:
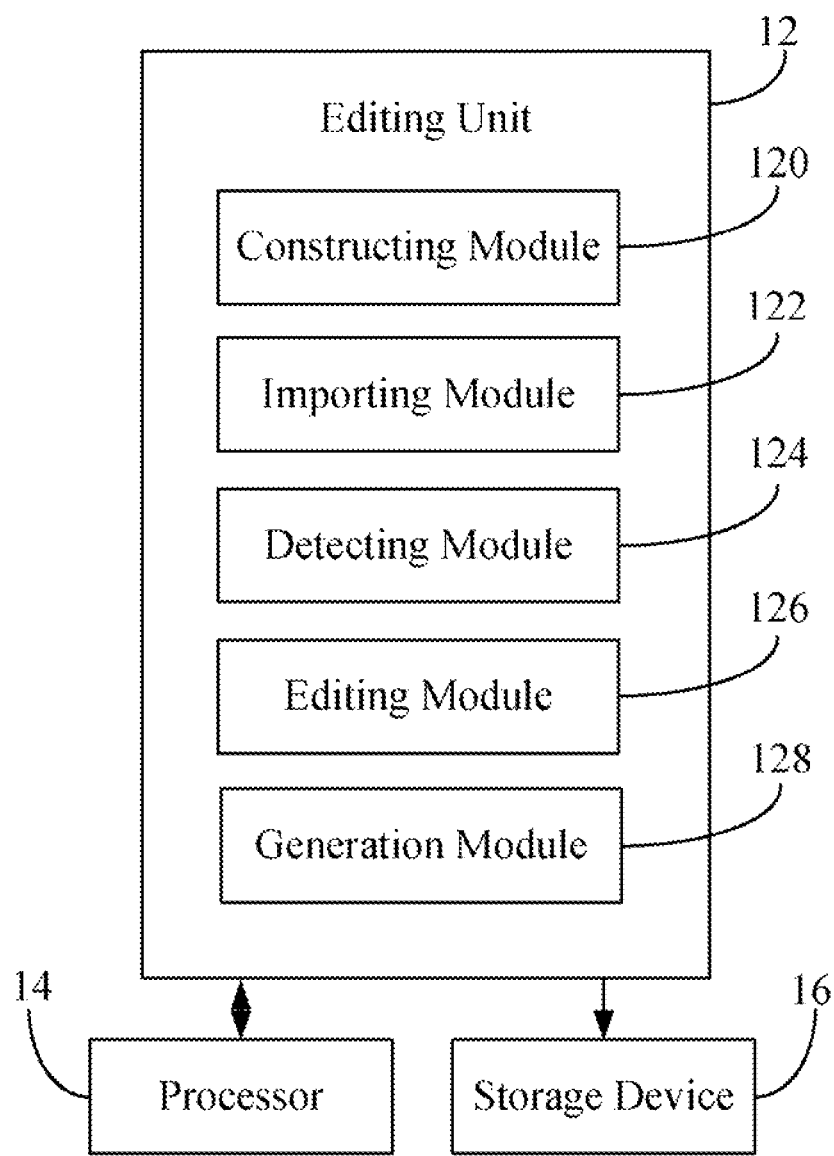
FIG. 2 is a block diagram of one embodiment of an editing unit included in the electronic device of FIG. 1 that comprises function modules.

FIG. 2 is a block diagram of one embodiment of the editing unit 12 comprising function modules. The editing unit 12 may include a constructing module 120, an importing module 122, a detecting module 124, an editing module 126, and a generation module 128. One or more electronic codes of the modules 120-128 may be executed by the processor 14 so as to edit an image to be used as a wallpaper or a background image that covers the entire display screen 10 of the electronic device 1. Further details of these modules 120-128 will be explained below.

Figure 3:
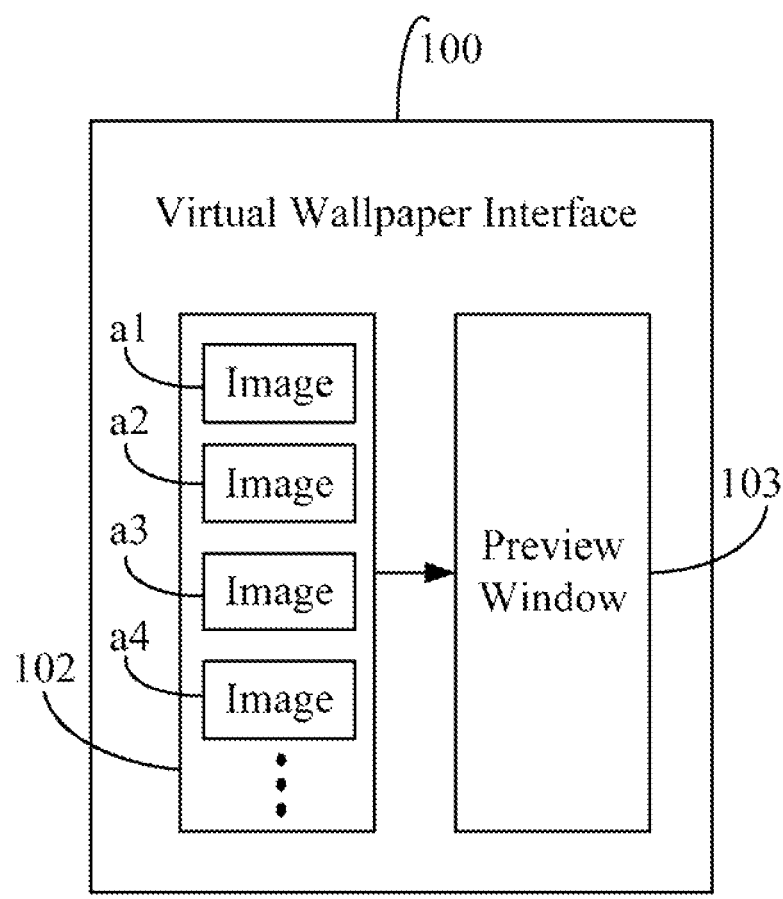
FIG. 3 illustrates an exemplary diagram of a virtual wallpaper interface included in the electronic device of FIG. 1.

The constructing module 120 constructs a virtual wallpaper interface 100 in the electronic device 1. In the embodiment, the interface 100 includes an image display area 102 and a preview window 103, see in FIG. 3. The area 102 displays a plurality of images stored in the storage device 16, labeled "a1," "a2," "a3," and "a4," etc., that are available for use as a wallpaper or a background image of the electronic device 1. In the embodiment, the plurality of images may be in a variety of display ratios and formats. Some of the images may be, for example, animated GIFs that can serve as annunciators and soft-keys. The annunciators may be used to indicate, for example, a signal intensity of the electronic device 1 (hereinafter referenced as "signal icon"), and a remaining charge of the electronic device 1 (hereinafter referenced as "battery icon"). The soft-keys may include a function table, operation icons, a main menu, for example.

The importing module 122 imports an image from the area 102 to the preview window 103, and proportionally resizes the image for displaying in the preview window 103 while preserving its original display ratio.

The detecting module 124 detects whether the display ratio of the resized image is greater than the aspect ratio of the preview window 103.

If the display ratio of the resized image is greater than the aspect ratio of the preview window 103, the processor 14 controls the editing module 126 to crop one or more portions of the resized image beyond sides of a display area of the preview window 103, so as to generate an edited image that fits the aspect ratio of the preview window 103. In the embodiment, the cropped portion is furthest from the subject of interest, namely important areas of the image can be protected from cropping.

If the display ratio of the resized image is not greater than the aspect ratio of the preview window 103, the processor 14 controls the editing module 126 to import at least one image selected from the area 102, merge the selected image with the resized image, and crop the portions of the merged image beyond the sides of the display area of the preview window 103, so as to generate an edited image that fits the aspect ratio of the preview window 103. For example, the editing module 126 imports the signal icon and the battery icon from the area 102 to the preview window 103, merges the signal icon and the battery icon with the resized image, and crops the portions of the merged image beyond the sides of the display area of the preview window 103, to obtain the edited image.

In the embodiment, the edited image may be saved in the storage device 16. The generation module 128 generates a desired image by proportionally enlarging the edited image for displaying in the display screen 10 while preserving its original display ratio. In the embodiment, the display ratio of the desired image is identical to the aspect ratio of the display screen 10, the desired image can be used as a wallpaper or a background image that covers the entire display screen 10 of the electronic device 1.

The generation module 128 is further operable to display the desired image on the display screen 10, and store the desired image in the storage device 16.

Figure 4:
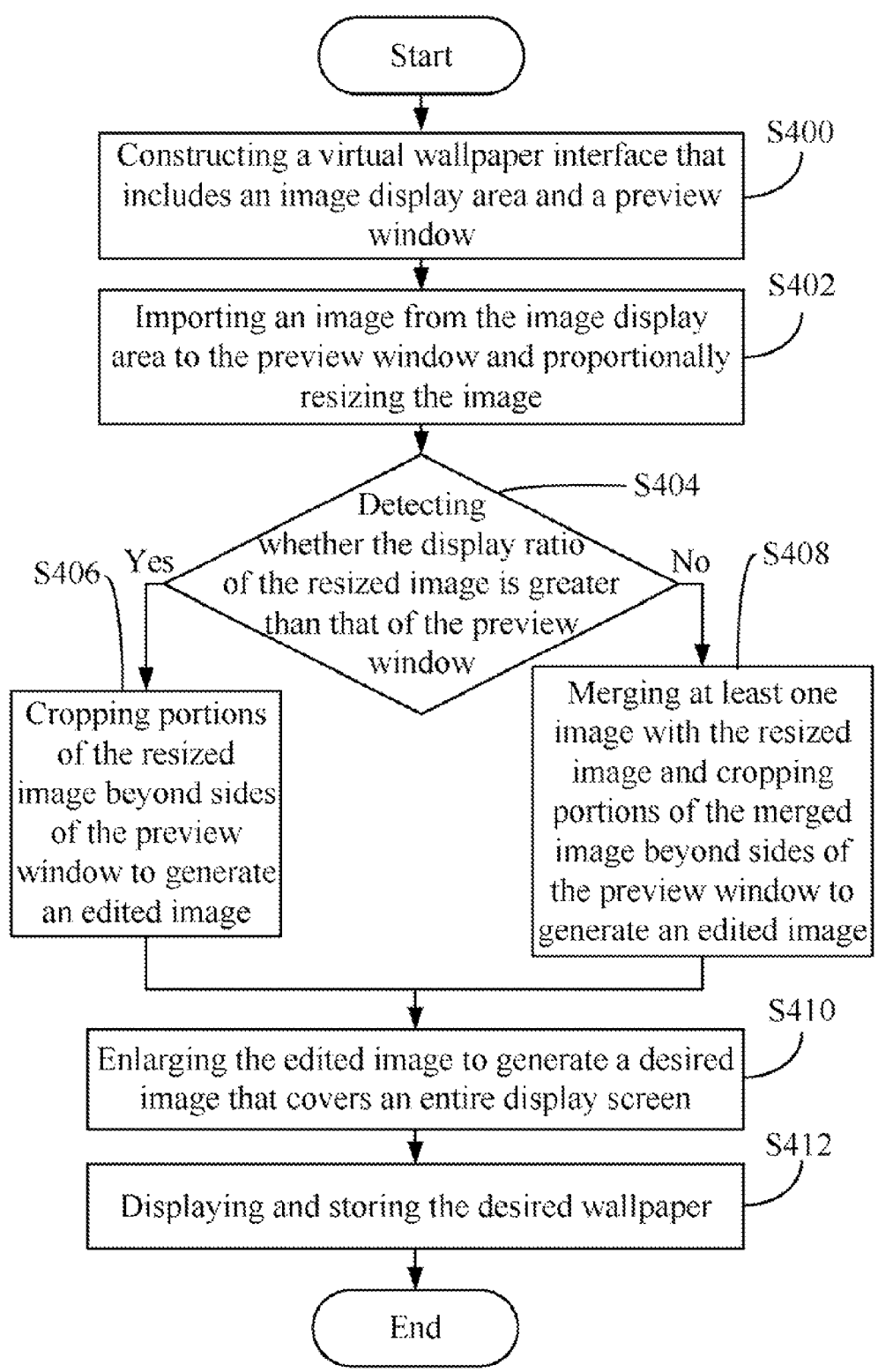
FIG. 4 is a flowchart illustrating one embodiment of a method for image editing of an electronic device.

FIG. 4 is a flowchart illustrating one embodiment of a method for image editing by utilizing the editing unit 12 as described in FIG. 1.

In block S400, the constructing module 120 constructs a virtual wallpaper interface 100 in the electronic device 1. In the embodiment, the interface 100 includes an image display area 102 and a preview window 103, see in FIG. 3. The area 102 displays a plurality of images stored in the storage device 16, labeled "a1," "a2," "a3," and "a4."

In block S402, the importing module 122 imports an image from the area 102 to the preview window 103, and proportionally resizes the image for displaying in the preview window 103 while preserving its original display ratio.

In block S404, the detecting module 124 detects whether the display ratio of the resized image is greater than the aspect ratio of the preview window 103. If the display ratio of the resized image is greater than the aspect ratio of the preview window 103, the flow enters block S406. Otherwise, if the display ratio of the resized image is not greater than the aspect ratio of the preview window 103, the flow enters block S408.

In block S406, the editing module 126 crops the portion of the resized image beyond the sides of the display area of the preview window 103, to generate an edited image that fits the aspect ratio of the preview window 103. For example, if the aspect ratio of the preview window 103 is "168*224," the display ratio of the resized image must be "168*224."

In block S408, the editing module 126 merges at least one image selected from the image display area 102 with the resized image, and crops the portion of the merged image beyond the sides of the display area of the preview window 103, to generate an edited image that fits the aspect ratio of the preview window 103.

In block S410, the generation module 128 proportionally enlarges the edited image for displaying in the display screen 10 while preserving its original aspect ratio, so as to generate a desired image. In the embodiment, the display ratio of the desired image is identical to the aspect ratio of the display screen 10, the desired image can be used as a wallpaper or a background image that covers the entire display screen 10 of the electronic device 1.

In block S412, the generation module 128 displays the desired image on the display screen 10 as a background image, and stores the desired image in the storage device 16. In the embodiment, the desired image can be displayed on the entire display screen 10 of the electronic device 1.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method for image editing of an electronic device, the electronic device comprising a display screen, the method comprising:
    constructing a virtual wallpaper interface on the display screen, the virtual wallpaper interface comprising an image display area and a preview window;
    importing an image from the image display area to the preview window, and proportionally resizing the image for displaying in the preview window while preserving an original display ratio of the image;
    detecting whether the display ratio of the resized image is greater than an aspect ratio of the preview window;
    cropping portions of the resized image beyond sides of a display area of the preview window to generate an edited image that fits the aspect ratio of the preview window, upon a condition that the display ratio of the resized image is greater than the aspect ratio of the preview window; or
    merging at least one image selected from the image display area with the resized image and cropping portions of the merged image beyond the sides of the display area of the preview window to generate an edited image that fits the aspect ratio of the preview window, upon a condition that the display ratio of the resized image is not greater than the aspect ratio of the preview window; and
    proportionally enlarging the edited image to cover the entire display screen while preserving an original display ratio of the edited image to generate a desired image.

2. The method as described in claim 1, further comprising:
    displaying the desired image on the display screen as a background image or a wallpaper; and
    storing the desired image in a storage device of the electronic device.

3. The method as described in claim 2, wherein the image display area is operable to display a plurality of images saved in the storage device.

4. An electronic device, comprising:
    a display screen; and
    an editing unit, comprising:
    a constructing module operable to construct a virtual wallpaper interface on the display screen, the virtual wallpaper interface comprising an image display area and a preview window;
    an importing module operable to import an image from the image display area to the preview window, and proportionally resize the image for displaying in the preview window while preserving an original display ratio of the image;
    a detecting module operable to detect whether the display ratio of the resized image is greater than the aspect ratio of the preview window;
    an editing module operable to crop portions of the resized image beyond sides of a display area of the preview window to generate an edited image that fits the aspect ratio of the preview window, upon a condition that the display ratio of the resized image is greater than the aspect ratio of the preview window, or merge at least one image selected from the image display area with the resized image, and crops portions of the merged image beyond the sides of the display area of the preview window to generate an edited image that fits the aspect ratio of the preview window, upon a condition that the display ratio of the resized image is not greater than the aspect ratio of the preview window; and
    a generation module operable to generate a desired image by proportionally enlarging the edited image to cover the entire display screen while preserving an original display ratio of the edited image.

5. The electronic device as described in claim 4, wherein the generation module is further operable to display the desired image on the display screen as a background image or a wallpaper, and store the desired image in a storage device of the electronic device.

6. The electronic device as described in claim 5, wherein the image display area is operable to display a plurality of images saved in the storage device.

7. A non-transitory storage medium having stored thereon instructions that, when executed by a processor of a electronic device, cause the processor to implement a method for image editing of the electronic device, the electronic device comprising a display screen, the method comprising:
    constructing a virtual wallpaper interface on a display screen, the virtual wallpaper interface comprising an image display area and a preview window;

importing an image from the image display area to the preview window, and proportionally resizing the image for displaying in the preview window while preserving an original display ratio of the image;

detecting whether the display ratio of the resized image is greater than an aspect ratio of the preview window;

cropping portions of the resized image beyond sides of a display area of the preview window to generate an edited image that fits the aspect ratio of the preview window, upon a condition that the display ratio of the resized image is greater than the aspect ratio of the preview window; or merging at least one image selected from the image display area with the resized image and cropping portions of the merged image beyond the sides of the display area of the preview window to generate an edited image that fits the aspect ratio of the preview window, upon a condition that the display ratio of the resized image is not greater than the aspect ratio of the preview window; and proportionally enlarging the edited image to cover the entire display screen while preserving an original display ratio of the edited image to generate a desired image.

8. The non-transitory storage medium as described in claim 7, wherein the method further comprises:

displaying the desired image on the display screen as a background image or a wallpaper; and storing the desired image in a storage device of the electronic device.

9. The non-transitory storage medium as described in claim 8, wherein the image display area is operable to display a plurality of images saved in the storage device.

* * * * *